(12) United States Patent
Du et al.

(10) Patent No.: US 10,590,841 B2
(45) Date of Patent: Mar. 17, 2020

(54) SINGLE SHAFT DUAL EXPANSION INTERNAL COMBUSTION ENGINE

(71) Applicant: GM GLOBAL TECHNOLOGY OPERATIONS LLC, Detroit, MI (US)

(72) Inventors: Hung-Yih Isaac Du, Rochester Hills, MI (US); Jun Zhou, Troy, MI (US); Russell P. Durrett, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 197 days.

(21) Appl. No.: 14/751,673

(22) Filed: Jun. 26, 2015

(65) Prior Publication Data
US 2016/0376980 A1  Dec. 29, 2016

(51) Int. Cl.
*F02B 41/06* (2006.01)
*F16F 15/26* (2006.01)
*F02B 75/04* (2006.01)
*F01B 9/02* (2006.01)

(52) U.S. Cl.
CPC ............ *F02B 41/06* (2013.01); *F02B 75/045* (2013.01); *F16F 15/265* (2013.01); *F01B 9/02* (2013.01)

(58) Field of Classification Search
CPC ........ F02B 41/06; F02B 75/18; F02B 75/045; F01B 9/02; F16F 15/265
USPC ...................................................... 123/52.1
See application file for complete search history.

(56) References Cited

U.S. PATENT DOCUMENTS

| 4,509,378 A | * | 4/1985 | Brown | F16F 15/265 |
| | | | | 123/192.2 |
| 5,146,749 A | | 9/1992 | Wood et al. | |
| 5,218,885 A | * | 6/1993 | Nakano | F02B 61/02 |
| | | | | 123/192.1 |

(Continued)

FOREIGN PATENT DOCUMENTS

| DE | 2840923 A1 | 4/1979 |
| DE | 3121301 A1 | 1/1983 |

(Continued)

OTHER PUBLICATIONS

Kwon-Hee Suh, Yoon-Ki Lee, and Hi-Seak Yoon, "A Study on the Balancing of the Three-Cylinder Engine with Balance Shaft", SAE Technical Paper Series 2000-01-0601, SAE World Congress, Detroit, Michigan, Mar. 6-9, 2000, 9 pps.

*Primary Examiner* — Stephen K Cronin
*Assistant Examiner* — Omar Morales
(74) *Attorney, Agent, or Firm* — Quinn IP Law

(57) ABSTRACT

A single-shaft dual expansion internal combustion engine includes an engine block, a cylinder head and a crankshaft. First and second power pistons are moveable in first and second power cylinders and are connected to first and second crankpins of the crankshaft. An expander piston is moveable in an expander cylinder and is connected via a multi-link connecting rod assembly to a third crankpin of the crankshaft. A first balance shaft is arranged in a first longitudinal opening in the engine block, and a second balance shaft is arranged in a second longitudinal opening in the engine block. The first and second balance shafts have first and second counterweight portions, respectively, and the crankshaft has a third counterweight portion causing an imbalance in the crankshaft.

11 Claims, 7 Drawing Sheets

(56) References Cited

U.S. PATENT DOCUMENTS

| | | | | |
|---|---|---|---|---|
| 5,230,311 A | * | 7/1993 | Kuhn | F02B 75/22 |
| | | | | 123/192.2 |
| 6,397,809 B1 | * | 6/2002 | Sayama | F02B 75/22 |
| | | | | 123/192.2 |
| 2014/0123958 A1 | * | 5/2014 | Durrett | F02B 41/08 |
| | | | | 123/48 R |

FOREIGN PATENT DOCUMENTS

| | | |
|---|---|---|
| WO | 9961766 A1 | 12/1999 |
| WO | 2010145628 A1 | 12/2010 |

* cited by examiner

SINGLE SHAFT DUAL EXPANSION INTERNAL COMBUSTION ENGINE

TECHNICAL FIELD

The present teachings generally include an internal combustion engine assembly.

BACKGROUND

Internal combustion engines combust mixtures of air and fuel to generate mechanical power for work. The basic components of an internal combustion engine may include an engine block, cylinder head, cylinders, pistons, valves, crankshaft and one or more camshafts. The cylinder heads, cylinders and tops of the pistons typically form variable volume combustion chambers into which fuel and air are introduced and combustion occurs as part of a thermodynamic cycle of the device. In all internal combustion engines, useful work is generated from the hot, gaseous products of combustion acting directly on moveable engine components, such as the top or crown of a piston. Generally, reciprocating motion of the pistons is transferred to rotary motion of a crankshaft via connecting rods. One known internal-combustion engine operates in a four-stroke combustion cycle, wherein a stroke is defined as a complete movement of a piston from a top-dead-center (TDC) position to a bottom-dead-center (BDC) position or vice versa, and the strokes include intake, compression, power and exhaust. Accordingly, a four-stroke engine is defined herein to be an engine that requires four complete strokes of a piston for every power stroke of a cylinder charge, i.e., for every stroke that delivers power to a crankshaft.

The overall efficiency of an internal combustion engine is dependent on its ability to maximize the efficiency of all the processes by minimizing tradeoffs that lead to energy losses to the environment. Dividing the traditional 4-stroke cycle amongst dedicated components allows the compression process to be made more efficient by attempting to approximate isothermal compression of a cylinder charge through mid-compression heat extraction, such as by using a heat exchanger. Likewise, a greater amount of energy may be harnessed during expansion of a cylinder charge by moving towards an adiabatic expansion, and extending that expansion further to bring the working gases down to atmospheric pressure. In addition, maximizing the ratio of specific heats of the working gas while reducing each specific heat individually allows greater energy extraction over the expansion while minimizing the mechanical and flow losses associated with each dedicated component.

Known engine systems may employ balance shafts to counteract and thus reduce vibrations from engine operation, including second-order vibrations caused by asymmetrical cylinder configurations. Balance shafts may be mounted in the engine block, and driven at a rotational speed that is double the engine speed employing a chain, gear or belt that is rotationally coupled to the engine. Balance shafts employ counterweights that are timed to cancel the second-order vibrations in the engine.

SUMMARY

A single-shaft dual expansion internal combustion engine is described and includes an engine block, a cylinder head, a single crankshaft, and a multi-link connecting rod assembly. First and second power cylinders and an expander cylinder are formed in the engine block. The first and second power pistons are moveable in the first and second power cylinders, respectively, and are connected to respective first and second crankpins of the crankshaft. An expander piston is moveable in the expander cylinder and is connected via the multi-link connecting rod assembly to a third crankpin of the crankshaft. A first balance shaft is arranged in a first longitudinal opening in the engine block, and a second balance shaft arranged in a second longitudinal opening in the engine block. The first and second balance shafts have first and second counterweight portions, respectively, and the crankshaft has a third counterweight portion causing an imbalance in the crankshaft.

The above features and advantages and other features and advantages of the present teachings are readily apparent from the following detailed description of the best modes for carrying out the present teachings when taken in connection with the accompanying drawings.

DETAILED DESCRIPTION

Figure 1:
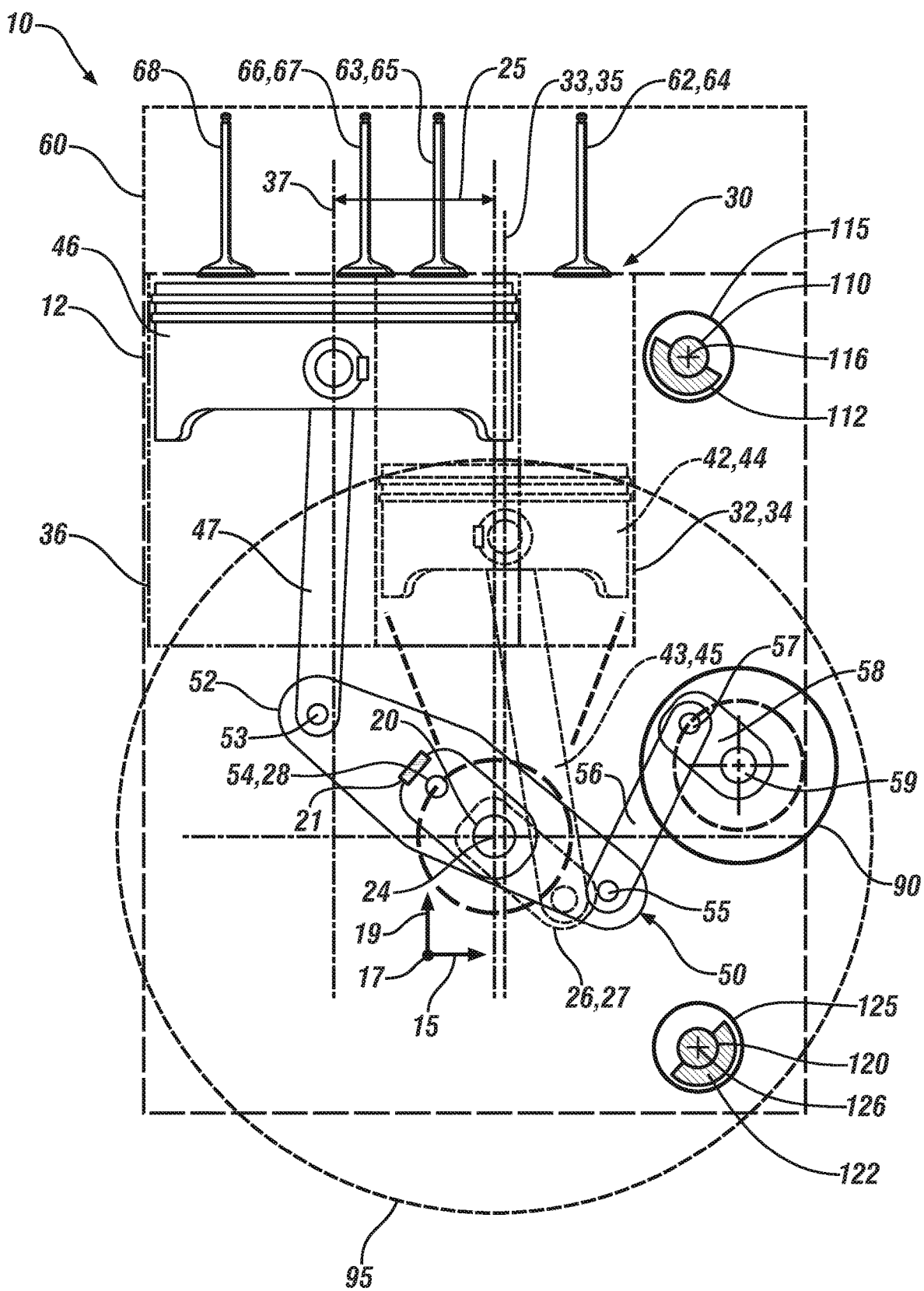
FIG. 1 schematically illustrates an end view of one embodiment of a single-shaft dual expansion internal combustion engine including first and second balance shafts, in accordance with the disclosure.
Figure 2:
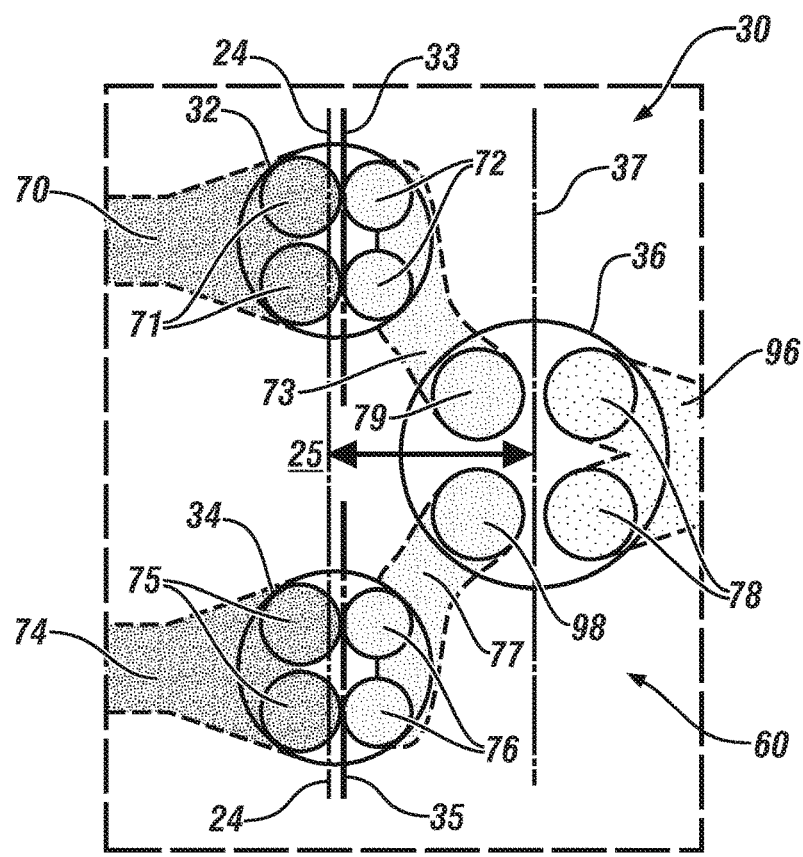
FIG. 2 schematically illustrates a top view of a portion of the embodiment of the single-shaft dual expansion internal combustion engine described with reference to FIG. 1, in accordance with the disclosure.

Referring to the drawings, wherein like reference numbers are used to identify like or identical components in the various views, FIG. 1 schematically illustrates an end view of one embodiment of a single-shaft dual expansion internal combustion engine (engine) 10, and FIG. 2 schematically illustrates a top view of a portion of the embodiment of the engine 10 in accordance with this disclosure. The engine 10 includes first and second balance shafts 110, 120, respectively. Like numerals indicate like elements throughout the various Figures.

The engine 10 includes an engine block 12 that includes a compound cylinder configuration including cylinder triplets 30 as described herein, a crankshaft main bearing mount for a crankshaft 20 and a cylinder head 60 that encloses a top portion of the engine block 12. Although only one cylinder triplet 30 is shown, the engine block 12 may include a plurality of cylinder triplets 30. The physical description is made with reference to a three-dimensional axis including a lateral axis 15, a longitudinal axis 17 and a vertical axis 19, with the longitudinal axis 17 defined by a center line 24 of the crankshaft 20, with the vertical axis 19 defined by parallel longitudinal axes of engine cylinders 32, 34, 36 composing one of the cylinder triplets 30 and with the lateral axis 15 defined as being orthogonal to the longitudinal axis 17 and the vertical axis 19. A disc-shaped flywheel may be coaxial with and rotatably couple to the crankshaft 20.

Each compound cylinder configuration includes one of the cylinder triplets 30 that includes first and second power cylinders 32, 34, respectively, and a third, expander cylinder 36. The first power cylinder 32 houses a first power piston 42 that is slidable therein to translate up and down in conjunction with rotation of the crankshaft 20, and rotatably couples via a first connecting rod 43 to a first crankpin 26 of the crankshaft 20. The first power cylinder 32 defines a first power cylinder center line 33. Similarly, the second power cylinder 34 houses a second power piston 44 that is slidable therein to translate up and down in conjunction with rotation of the crankshaft 20, and rotatably couples via a second connecting rod 45 to a second crankpin 27 of the crankshaft 20 through a second connecting rod 45. The second power cylinder 36 defines a second power cylinder center line 35. The first and second power cylinders 32, 34, first and second power pistons 42, 44 and associated components are preferably dimensionally equivalent, and the first and second crankpins 26, 27 are radially coincident, i.e., they rotatably couple to the crankshaft 20 at the same rotational angle. In one embodiment, the first and second power cylinder center lines 33, 35 define a plane that intersects with the crankshaft center line 24. Alternatively, and as shown the first and second power cylinder center lines 33, 35 define a plane that is offset from the crankshaft center line 24. The expander cylinder 36 is adjacent to the first and second power cylinders 32, 34, and has a center line 37 that is parallel to the first and second power cylinder center lines 33, 35. An expander piston 46 is housed in the expander cylinder 36 and is slidable therein to translate up and down in conjunction with rotation of the crankshaft 20, and couples to a third connecting rod 47 that rotatably couples to the crankshaft 20 by the multi-link connecting rod assembly 50. The expander cylinder 36 is preferably considerably larger in volume than the individual power cylinders 32, 34, and is preferably in a range between 1.5 times and 4.0 times the volumetric displacement of one of the individual power cylinders 32, 34. Cylinder displacement for the expander cylinder 36 is defined based upon piston movement between a top-dead-center (TDC) location and a bottom-dead-center (BDC) location, is application-specific and is determined as described herein. Furthermore, the TDC location and the BDC location for the expander cylinder 36 may be changeable.

The multi-link connecting rod assembly 50 forms a multi-bar linkage that translates linear reciprocating motion of the expander piston 46 offset from the crankshaft center line 24 to rotary motion of the crankshaft 20 while minimizing side-loading of the expander piston 46. An offset 25 between the crankshaft center line 24 and the center line 37 of the expander cylinder 36 is shown with reference to FIG. 2. The multi-link connecting rod assembly 50 includes a rigid main link arm 52 that is a three-pin plate that includes a first pivot pin 53, a second pivot pin 54 and a third pivot pin 55. The first pivot pin 53 of the main link arm 52 rotatably couples to the third connecting rod 47 that couples to the expander piston 46. The second pivot pin 54 of the main link arm 52 rotatably couples to the third crankpin 28 of the crankshaft 20. The third crankpin 28 of the crankshaft 20 is collocated with the second pivot pin 54 on the multi-link connecting rod assembly 50 and is rotated 180° about the crankshaft center line 24 from the first and second crankpins 26, 27. In one embodiment, and as shown, the third crankpin 28 has an eccentric mass in the form of a counterweight 21 added thereto. Alternatively, the first and second crankpins 26, 27 may have added counterweights. The third pivot pin 55 of the main link arm 52 rotatably couples to a first end of a swing arm 56, and a second end of the swing arm 56 rotatably couples to a fourth pivot pin 57, which is a rotating anchor point that couples to a distal end of a rotating arm 58 that fixedly attaches to a control shaft 59 to rotate therewith. In one embodiment, and as shown the variable phasing device (phaser) 90 is inserted between the rotating arm 58 and the control shaft 59 and rotatably couples the rotating arm 58 to the control shaft 59 to effect phasing control of the rotating arm 58 and the rotating anchor point at the fourth pivot pin 57. Mechanization and control of phasing devices such as the phaser 90 are known and not described in detail. The control shaft 59 is a rotatable element that has an axial centerline that is parallel with the crankshaft center line 24 and rotatably couples to the crankshaft 20 at a predetermined distance from the crankshaft center line 24 and rotates at the same rotation speed, and the phaser 90 is controlled to control rotational phasing of the rotating arm 58 in relation to rotational position of the crankshaft 20. The control shaft 59 rotates in the same direction as the crankshaft 20 in one embodiment. Alternatively the control shaft 59 rotates in the opposite direction as the crankshaft 20.

In one embodiment, the phasing authority of the phaser 90 is between 0° (Position 1) and 180° of rotation (Position 2). The effect of controlling phasing of the phaser 90 is to control rotational phasing of the rotating arm 58 in relation to rotational position of the crankshaft 20. The reciprocating movement of the expander piston 46 is 180° out of phase with the reciprocating movement of the first and second power pistons 42, 44. Thus, when the expander piston 46 is at a TDC point, the first and second power pistons 42, 44 are at BDC points. The arrangement of the elements of the multi-link connecting rod assembly 50 affects the stroke of the corresponding first expander piston 46 and hence the volumetric displacement and geometric compression ratio thereof.

The multi-link connecting rod assembly 50 mechanically couples the in-cylinder translations of the first and second power pistons 42, 44 with the in-cylinder translation of the expander piston 46 during rotation of the crankshaft 20 through the first, second and third crankpins 26, 27 and 28. The first pivot pin 53 and the second pivot pin 54 of the rigid main link arm 52 defines a first linear distance. The second pivot pin 54 and the third pivot pin 55 define a second linear distance. This configuration including the main link arm 52 permits the stroke of the expander piston 46 to differ from a third crank throw length that is defined by the third crankpin 28 of the crankshaft 20.

A magnitude of a linear travel distance of the expander piston 46 between a TDC point and a BDC point is determined based upon the lever arm, i.e., a first linear distance and the second linear distance between the pivot pins, the third crank throw, the throw of the rotating anchor arm and fourth pivot pin 57, and the phasing of the rotating arm 58 with respect to the crankshaft 20 all affect the stroke of the expander piston 46. As such, when the phaser 90 is controlled to position 1, the expander piston 46 is active and moves between a first top-dead-center (TDC) point and a first bottom-dead-center (BDC) point with each rotation of the crankshaft 20 and has an active piston stroke travel distance. When the phaser 90 is controlled to position 2, the expander piston 46 is deactivated and moves between a second TDC point and a second BDC point with each rotation of the crankshaft 20 and has a deactivated piston stroke travel distance. The active piston stroke travel distance is substantially greater than the deactivated piston stroke travel distance.

The cylinder head 60 is an integrated device including cast portions, machined portions and assembled portions for controlling and directing flows of intake air, fuel and combustion gases into and out of the first and second power cylinders 32, 34 and the expander cylinder 36 to effect engine operation to generate mechanical power. The cylinder head 60 includes structural bearing supports for power cylinder camshaft(s) and expander camshaft(s). The cylinder head 60 includes first and second power cylinder intake runners 70, 74, respectively, which fluidly connect to first and second power cylinder intake ports 71, 75, respectively, with engine intake airflow controlled by first and second power cylinder intake valves 62, 64, respectively. As shown, there are two intake valves per cylinder, although any suitable quantity, e.g., one or three intake valves per cylinder, may be employed. Engine intake air originates from an ambient air source, which may pass through a pressurizing device such as a turbocharger or a supercharger prior to entering the first and second power cylinder intake runners 70, 74. The cylinder head 60 also includes first and second power cylinder exhaust ports 72, 76, with engine exhaust airflow controlled by first and second power cylinder exhaust valves 63, 65, respectively. As shown, there are two exhaust valves per cylinder, although any suitable quantity, e.g., one or three exhaust valves per cylinder, may be employed. The first and second power cylinder intake valves 62, 64 and exhaust valves 63, 65 are normally-closed spring-biased poppet valves that are activated by rotation of the power cylinder camshafts in one embodiment, and may alternatively include any other suitable valve and valve activation configuration. The cylinder head 60 supports elements necessary to initiate combustion, e.g., a spark plug and a fuel injector in one embodiment, for each of the first and second power cylinders 32, 34.

The first power cylinder exhaust port 72 fluidly couples via a first expander cylinder intake runner 73 to a first expander cylinder intake port 79, with flow controlled by a first expander cylinder intake valve 66 and the first power cylinder exhaust valve 63. The second power cylinder exhaust port 76 fluidly couples via a second expander cylinder intake runner 77 to a second expander cylinder intake port 98, with flow controlled by a second expander cylinder intake valve 67 and the second power cylinder exhaust valve 65. The cylinder head 60 also includes one or a plurality of expander cylinder exhaust port(s) 78, two of which are shown, with corresponding expander cylinder exhaust valve(s) 68 that fluidly connect to an expander cylinder exhaust runner 96 that leads to an exhaust system that may include exhaust purification devices, a turbocharger, exhaust sound tuning devices, etc. The first expander cylinder intake valve 66, the second expander cylinder intake valve 67 and the expander cylinder exhaust valve(s) 68 may be normally-closed spring-biased poppet valves that may be activated by rotation of the expander camshaft in one embodiment, and may alternatively include any other suitable camshaft configuration. The rotations of the power cylinder camshafts and the expander camshafts are preferably indexed and linked to rotation of the crankshaft 20. The first and second crankpins 26, 27 of the crankshaft 20 rotatably couple with the first and second power pistons 42, 44 through the first and second connecting rods 43, 45.

Operation of the engine 10 described herein includes as follows. The first and second power cylinders 32, 34 both operate in four-stroke cycles including repetitively executed intake-compression-expansion-exhaust strokes over 720° of crankshaft rotation. The four-stroke cycle associated with the second power cylinder 34 is out of phase from the cycle associated with the first power cylinder 32 by 360° of crankshaft rotation. As such, when the first power cylinder 32 is in the intake stroke, the second power cylinder 34 is in the expansion stroke, and when the second power cylinder 34 is in the intake stroke, the first power cylinder 32 is in the expansion stroke. The expander cylinder 36 operates in a two-stroke cycle including an intake stroke and an exhaust stroke, wherein the intake stroke is alternately coordinated with the exhaust strokes from the first and second power cylinders 32, 34. As such, each of the power cylinders 32, 34 displaces its exhaust gas into the expander cylinder 36 in alternating fashion.

The engine block 12 includes first and second longitudinal cylindrical-shaped bores 115, 125, respectively and accompanying bearing surfaces that accommodate first and second balance shafts 110, 120, respectively. The balance shafts 110, 120 each include a shaft portion, a first portion that is concentric with a respective centerline 116, 126 defining a longitudinal axis of the corresponding first and second longitudinal bores 115, 125 and respective eccentric masses in the form of counterweights 112, 122. Other elements such as sprocket drive gears, bearings and related elements may be included in the embodiment but have been omitted for ease of illustration. Rotations of the first balance shaft 110 and the second balance shaft 120 are linked to rotation of the crankshaft 20 such that they rotate at the same rotational speed, and the direction of rotation of the first balance shaft 110 is opposite to the direction of rotation of the second balance shaft 120.

The engine 10 may be subject to force imbalances due to the inertia load of reciprocating mass and linkage movements and discrete combustion events periodically acting upon the rotating crankshaft 20 through the pistons. Such force imbalance may be described in terms of a primary lateral shaking force, a vertical shaking force and rolling moments. Engine balancing preferably includes achieving lateral balancing, i.e., balancing along the Y-axis. This may be accomplished by adding the counterweight 21 to the crankshaft 20. The eccentric mass of the counterweight 21 may be determined as follows:

$$m_{icw} * r_{icw} = N_{lateral} / \omega^2 \qquad [1]$$

wherein $m_{icw}$ is a mass of the counterweight 21, $r_{icw}$ is a radial distance to the centerline of the crankshaft 20, $\omega$ is the rotational speed of the crankshaft 20 and $N_{lateral}$ is the primary lateral shaking force. The inclusion of the counterweight 21 also reduces vertical shaking forces due to a phase difference of approximately 90° of rotation.

Figure 3:
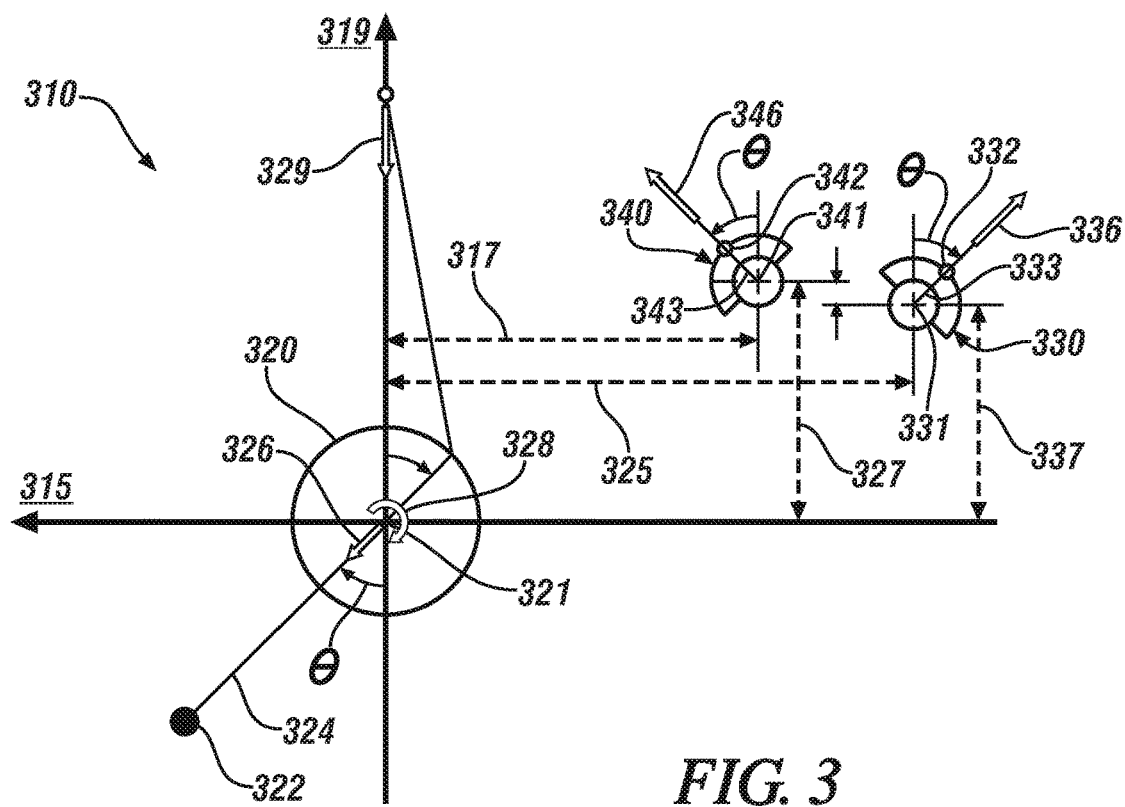
FIG. 3 graphically shows a force diagram associated with selected elements of an embodiment of the single-shaft dual expansion internal combustion engine including first and second balance shafts, in accordance with the disclosure.

FIG. 3 graphically shows an arrangement of selected rotatable elements of one embodiment of a single-shaft dual expansion internal combustion engine 310 including first and second balance shafts, and elements of a related force diagram. The internal combustion engine 310 is shown in a YZ plane, wherein the Y-axis 315 corresponds to the lateral axis 15 of the engine 10 described with reference to FIG. 1, the Z-axis 319 corresponds to the vertical axis 19 of the engine 10 described with reference to FIG. 1, and the X-axis (not shown) corresponds to the longitudinal axis 17 of the engine 10 described with reference to FIG. 1. The elements as shown include a crankshaft 320, a first balance shaft 330, and a second balance shaft 340. The crankshaft 320 has a rotational centerline 321 that is collocated with the X-axis, and includes a crankshaft counterweight 322 having eccentric mass $m_p$ that has a center of mass that is located at a crankshaft radius $r_p$ 324 distal to the centerline 321. The rotational centerline 321 defines a locus of (0,0) for the analyses described herein. The symbol θ indicates the rotational crank angle, preferably as relates to cylinder 1. A vector 326 is defined by a line segment between the locus (0,0) and the crankshaft counterweight 322. Vector 326 is 180° out of phase with the crank angle θ.

The first balance shaft 330 has a rotational centerline 331 that is defined by locus $(Y_1, Z_1)$ wherein $Y_1$ 325 is a lateral distance along the Y-axis 315 and $Z_1$ 327 is a vertical distance along the Z-axis 319. The first balance shaft 330 includes a first eccentric mass $m_{b1}$ 332 that has a center of mass that is located at a first radius $r_{b1}$ 333 distal to the rotational centerline 331 that is defined by locus $(Y_1, Z_1)$. A vector 336 is defined by a line segment between the locus $(Y_1, Z_1)$ and the first eccentric mass $m_{b1}$ 332, and is in phase with the crank angle θ and is 180° out of phase with the vector 326, and is rotating in the same direction.

The second balance shaft 340 has a rotational centerline 341 that is defined by locus $(Y_2, Z_2)$ wherein $Y_2$ 317 is a lateral distance along the Y-axis 315 and $Z_2$ 327 is a vertical distance along the Z-axis 319. The second balance shaft 340 includes a second eccentric mass $m_{b2}$ 342 that has a center of mass that is located at a second radius $r_{b2}$ 343 distal to the rotational centerline 341 that is defined by locus $(Y_2, Z_2)$. A vector 346 is defined by a line segment between the locus $(Y_2, Z_2)$ and the second eccentric mass $m_{b2}$ 342, is in phase with the crank angle but is rotating in the opposite direction.

Primary balancing of the rotating elements includes determining various forces acting on and through the various rotating elements in context of the overall system. The forces include a primary imbalance vertical load F cos θ 329, which is due to the system reciprocating mass assuming the primary lateral load has been zeroed out; an imbalance force on the crankshaft $N_p$ 326, a first counter imbalance force $N_1$ in the form of vector 336 acting on the first balance shaft 330, a second counter imbalance force $N_2$ in the form of vector 346 acting on the second balance shaft 340, and a moment T 328, which represents a primary imbalance rolling moment.

The imbalance force $N_p$ 326 acting on the crankshaft 320 may be determined as follows:

$$N_p = m_p * r_p * \omega^2 \qquad [2]$$

wherein w represents the rotational speed of the crankshaft 320, $m_p$ represents the eccentric mass of the crankshaft counterweight 322, and $r_p$ represents the radial distance 324 to a center of the eccentric mass $m_p$ of the crankshaft counterweight 322 relative to its centerline 321.

The first counter imbalance force $N_1$ in the form of vector 336 acting on the first balance shaft 330 may be determined as follows:

$$N_1 = m_{b1} * r_{b1} * \omega^2 \qquad [3]$$

wherein ω represents the rotational speed of the crankshaft 320, $m_{b1}$ represents the eccentric mass of the first balance shaft counterweight 332, and $r_{b1}$ represents the radial distance 333 to a center of mass of the first balance shaft counterweight 332 relative to its centerline 331.

The second counter imbalance force $N_2$ in the form of vector 346 acting on the second balance shaft 340 may be determined as follows:

$$N_2 = m_{b2} * r_{b2} * \omega^2 \qquad [4]$$

wherein ω represents the rotational speed of the crankshaft 320, $m_{b2}$ represents the eccentric mass of the second balance shaft counterweight 342, and $r_{b2}$ represents the radial distance 343 to a center of mass of the second balance shaft counterweight 342 relative to centerline 341.

In order to achieve balancing in the vertical direction, i.e., along the Z-axis, the sum of the forces in the Z-direction and the Y-direction have to be balanced, i.e., equal to zero. The term θ represents an angle of rotation of the crankshaft.

$$\Sigma F_z = 0$$

$$F \cos\theta + N_p \cos\theta = N_1 \cos\theta + N_2 \cos\theta$$

$$\Sigma F_y = 0$$

$$N_p \sin\theta + N_2 \sin\theta + N_1 \sin\theta \qquad [5]$$

Solving the force equilibrium equations yields the following equations:

$$N_2 = 0.5 F \qquad [6]$$

$$N_1 = N_2 + N_p = 0.5 F + N_p \qquad [6]$$

In order to achieve balancing of the primary rolling moment, the sum of the moment is balanced, i.e., is set equal to zero, as follows.

$$\Sigma M_X = 0$$

$$T\cos(\theta+\beta) + N_1 \sin\theta * Z_1 = N_1 \cos\theta * Y_1 + N_2 \cos\theta * Y_2 + N_2 \sin\theta * Z_2 \qquad [7]$$

wherein T represents the primary imbalance rolling moment due to the system reciprocating mass, i.e., moment T 328 and β is a phase difference between the moment T 328 and the crank angle θ. Assuming a small value for β, EQ. 7 may be reduced to EQ. 8, as follows.

$$T\cos\theta + N_1 \sin\theta * Z_1 = N_1 \cos\theta * Y_1 + N_2 \cos\theta * Y_2 + N_2 \sin\theta * Z_2 \qquad [8]$$

EQ. 9 may be employed to determine the position relationship between Y1 and Y2, the horizontal positions of the balance shafts, as follows.

$$T = N_1 * Y_1 + N_2 * Y_2 \qquad [9]$$

wherein T represents the primary imbalance rolling moment, i.e., moment T 328.

EQ. 10 may be employed to determine the position relationship between Z1 and Z2, the vertical positions of the balance shafts, as follows.

$$N_1 * Z_1 = N_2 * Z_2 \qquad [10]$$

A solution for $Y_1$ based upon $Y_2$ may be determined by substituting as follows:

$$N_2 = 0.5F$$

$$N_1 = 0.5F + N_p \quad [11]$$

which includes $$Y_1 = (T - 0.5F * Y_2)/(0.5F + N_p) \quad [12]$$

and $$Z1 = Z_2(0.5*F/(0.5*F + N_p)) \quad [13]$$

Thus, there are three degrees of freedom, including the eccentric mass $m_p$ of the crankshaft counterweight 322, and dimensions $Y_1$ and $Z_1$ related to the location of the rotational centerline 331 of the first balance shaft 330, which may be iteratively evaluated to identify preferred balance shaft designs and preferred balance shaft locations to compensate for system rotational imbalances and thus minimize rolling torque. Locations and masses in the form of locus $(Y_2, Z_2)$ and the second eccentric mass $m_{b2}$ 342, locus $(Y_1, Z_1)$ and the first eccentric mass $m_{b1}$ 332 and locus $(0,0)$ and the eccentric mass $m_p$ of the crankshaft counterweight 322 may thus be determined that meet the system requirements.

Figure 4:
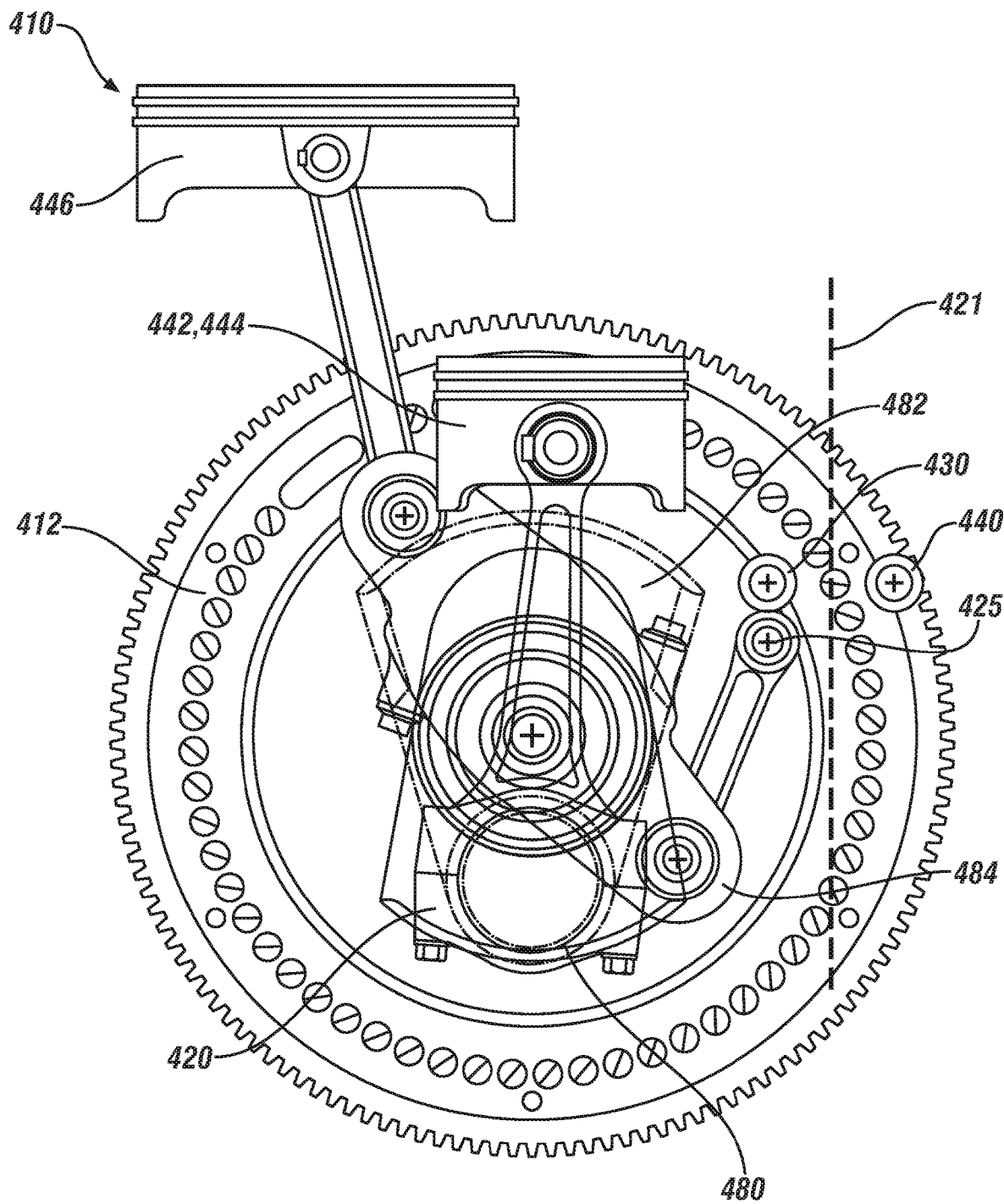
FIG. 4 schematically shows an end view of selected elements of an embodiment of a single-shaft dual expansion internal combustion engine that includes dual balance shafts, a crankshaft and a control shaft, wherein the first balance shaft is collocated with the control shaft, in accordance with the disclosure.

FIG. 4 schematically shows an end view of selected elements of an embodiment of a single-shaft dual expansion internal combustion engine (engine) 410 including dual balance shafts that is analogous to the engine 10 described with reference to FIG. 1. Elements of the engine 410 include a crankshaft 420 including crankpin 480 and counterweight 482, a first balance shaft 430, a second balance shaft 440, a control shaft 425, first and second power pistons 442, 444, respectively, expander piston 446, multi-link connecting rod assembly 484 and flywheel 412. As shown, the first balance shaft 430 is collocated with the control shaft 425, and the location of the second balance shaft 440 is determined in accordance with EQS. 1-13, described herein, with an added limitation that the second balance shaft 440 be located at the same vertical height, i.e., have the same Z-dimension as the first balance shaft 430.

Figure 5:
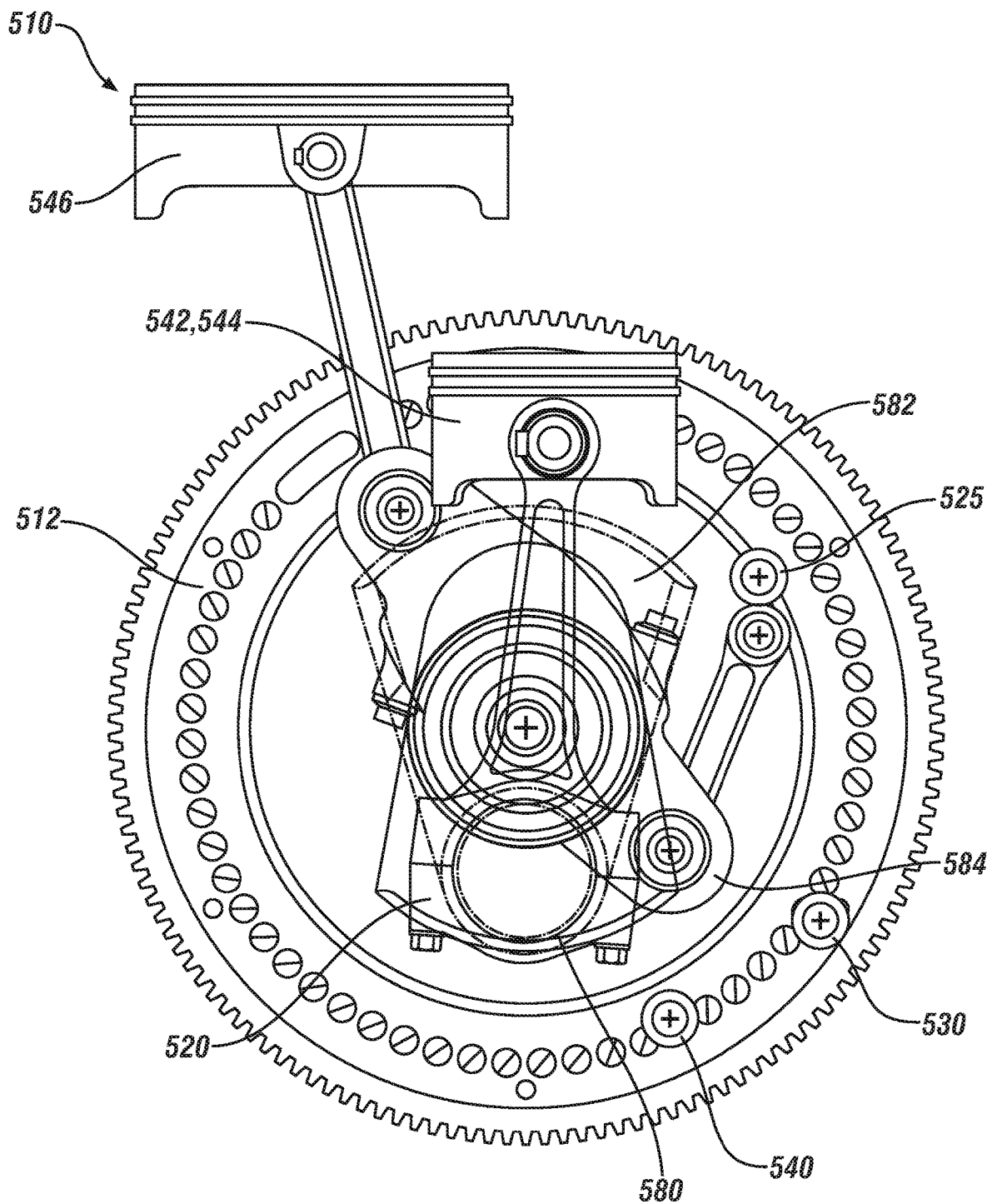
FIG. 5 schematically shows an end view of selected elements of an embodiment of a single-shaft dual expansion internal combustion engine that includes dual balance shafts, a crankshaft and a control shaft, wherein the first and second balance shafts are located within an envelope defined by an outer periphery of the engine, in accordance with the disclosure.

FIG. 5 schematically shows an end view of selected elements of an embodiment of a single-shaft dual expansion internal combustion engine (engine) 510 including dual balance shafts that is analogous to the engine 10 described with reference to FIG. 1. Elements of the engine 510 include a crankshaft 520 including crankpin 580 and counterweight 582, a first balance shaft 530 a second balance shaft 540, a control shaft 525, first and second power pistons 542, 544, respectively, expander piston 546, and multi-link connecting rod assembly 584 and flywheel 512. As shown, the location of the first balance shaft 530 and the location of the second balance shaft 540 are determined in accordance with EQS. 1-13, described herein, with the added limitation that the second balance shaft 540 and the first balance shaft 530 be located within an envelope defined by an outer periphery of the engine 510. As shown, the first and second balance shafts 530, 540 are splayed, i.e., at differing Z-axis dimensions.

Figure 6:
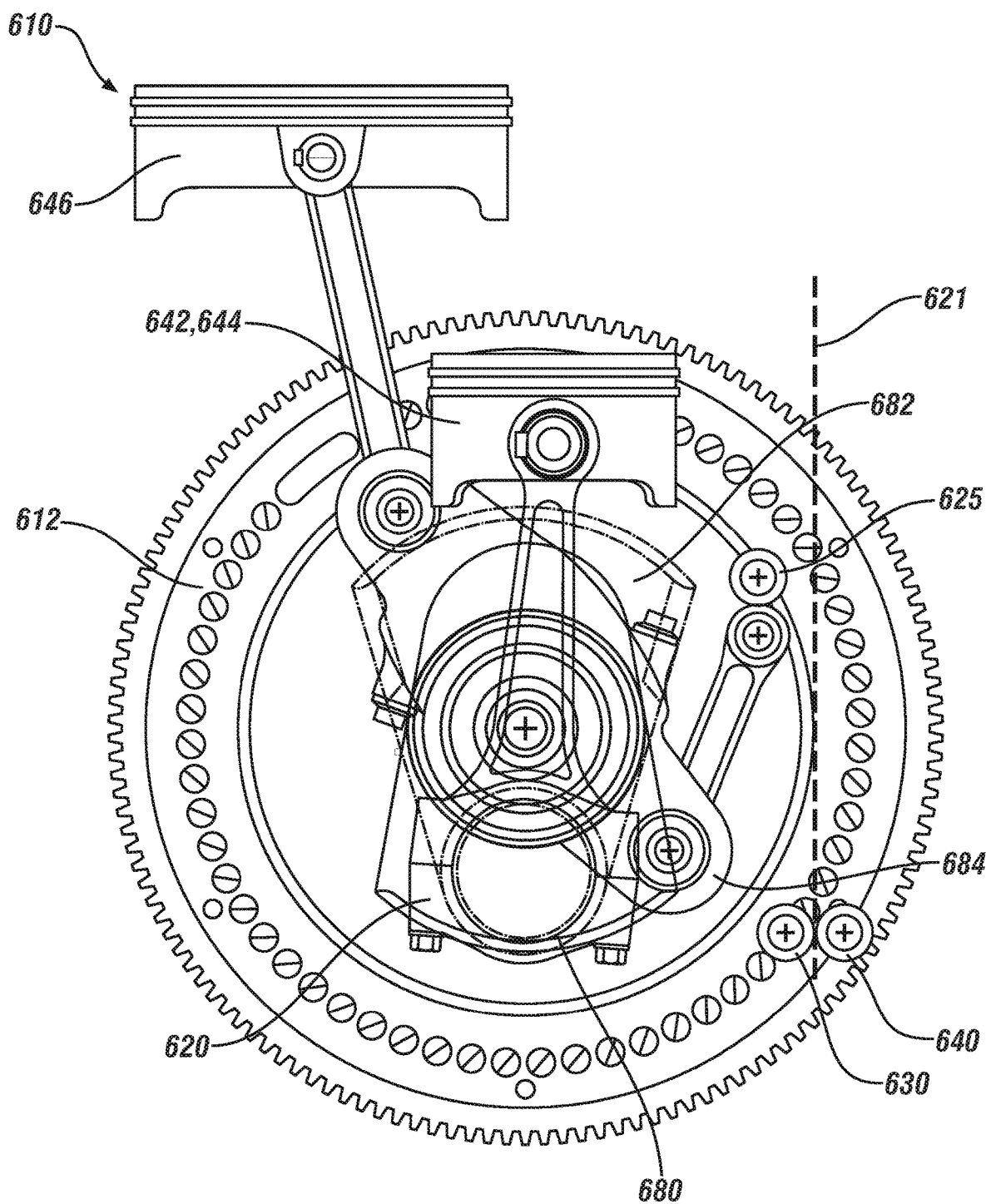
FIG. 6 schematically shows an end view of selected elements of an embodiment of a single-shaft dual expansion internal combustion engine that includes dual balance shafts, a crankshaft and a control shaft, wherein the second balance shaft is located at the same vertical height as the first balance shaft, in accordance with the disclosure.

FIG. 6 schematically shows an end view of selected elements of an embodiment of a single-shaft dual expansion internal combustion engine (engine) 610 including dual balance shafts that is analogous to the engine 10 described with reference to FIG. 1. Elements of the engine 610 include a crankshaft 620 including crankpin 680 and counterweight 682, a lateral distance 621 from the crankshaft centerline, a first balance shaft 630, a second balance shaft 640, a control shaft 625, first and second power pistons 642, 644, respectively, expander piston 646, multi-link connecting rod assembly 684, and flywheel 612. In this embodiment, the first balance shaft 630 is adjacent to and parallel with the second balance shaft 640, and both are located in accordance with EQS. 1-13, described herein, with an added limitation that the second balance shaft 640 be located at the same vertical height, i.e., have the same Z-dimension as the first balance shaft 630. The arrangement of the first balance shaft 630 adjacent to and parallel with the second balance shaft 640 permits radial overlap of the respective counterweights, thus permitting a compact design.

Figure 7:
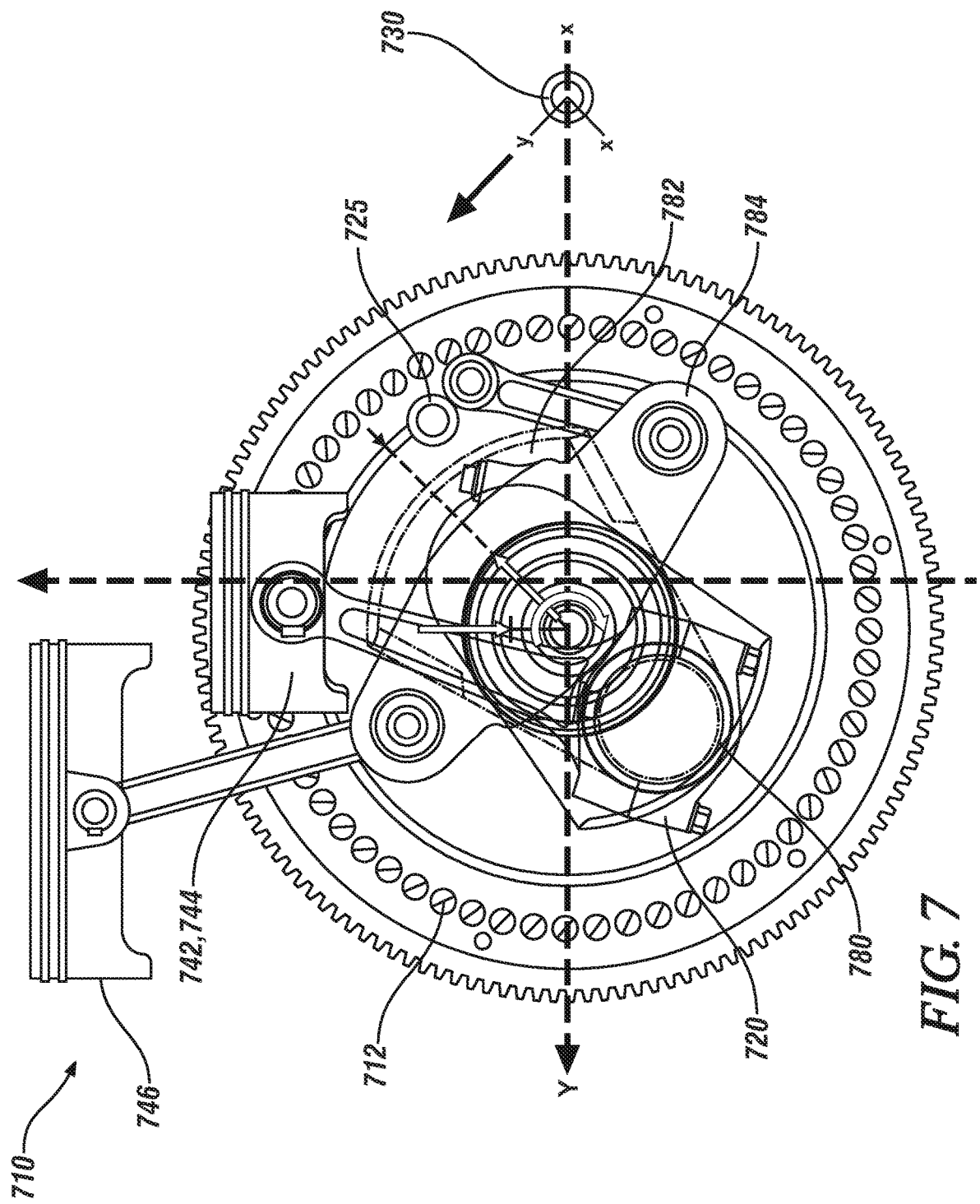
FIG. 7 schematically shows an end view of an embodiment of a single-shaft dual expansion internal combustion engine including a single balance shaft, in accordance with the disclosure.

FIG. 7 schematically shows an end view of selected elements of an embodiment of a single-shaft dual expansion internal combustion engine (engine) 710 that is analogous to the engine 10 described with reference to FIG. 1. Elements of the engine 710 include a crankshaft 720 including crankpin 780 and counterweight 782, a single balance shaft 730, a control shaft 725, first and second power pistons 742, 744, respectively, expander piston 746 and flywheel 712. In this embodiment, the balance shaft 730 is located in accordance with EQS. 14-20, described herein.

Figure 8:
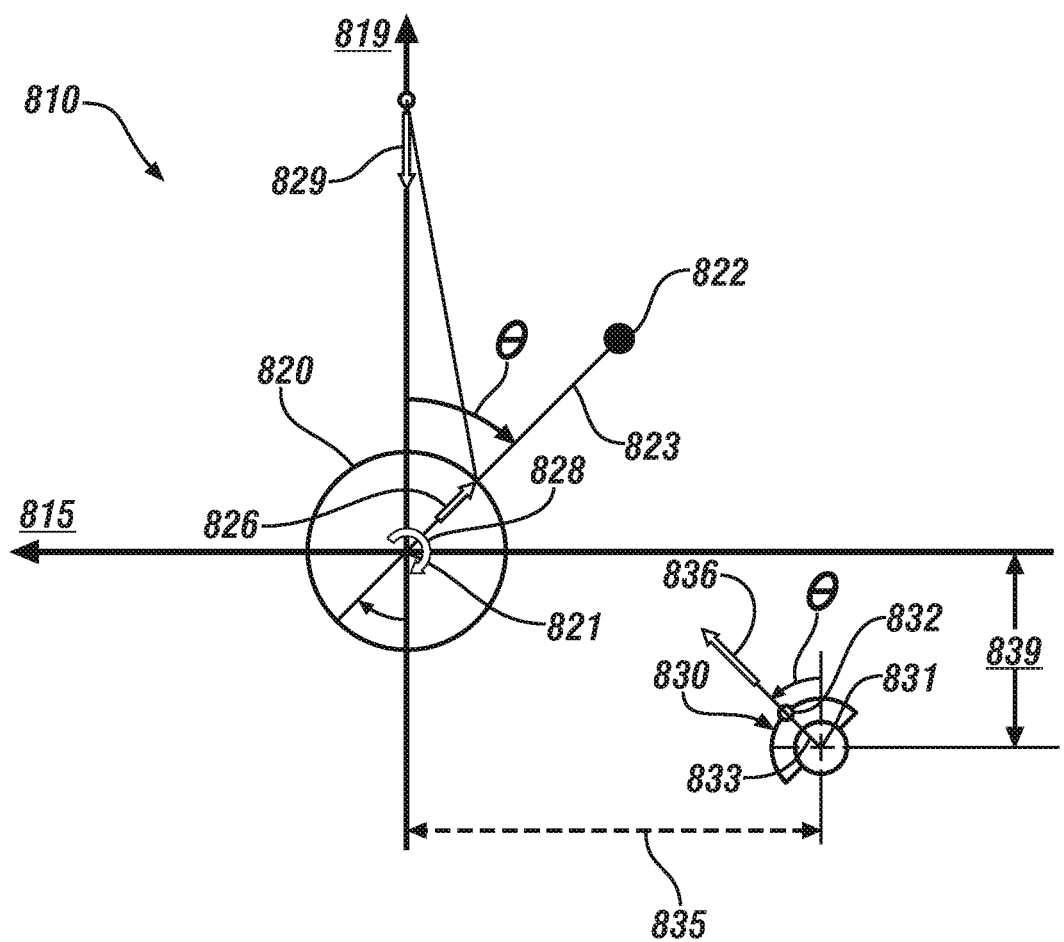
FIG. 8 graphically shows a force diagram associated with selected elements of an embodiment of the single-shaft dual expansion internal combustion engine including a single balance shaft, in accordance with the disclosure.

FIG. 8 graphically shows an arrangement of the rotatable elements of one embodiment of the single-shaft dual expansion internal combustion engine 810 including a single balance shaft and an associated force diagram. The internal combustion engine 810 is shown in a YZ plane, wherein the Y-axis 815 corresponds to the lateral axis 15 of the engine 10 described with reference to FIG. 1, the Z-axis 819 corresponds to the vertical axis 19 of the engine 10 described with reference to FIG. 1, and the X-axis (not shown) corresponds to the longitudinal axis 17 of the engine 10 described with reference to FIG. 1. The elements as shown include a crankshaft 820 and a single balance shaft 830. The crankshaft 820 rotates in a direction that is opposite to the rotational direction of the single balance shaft 830, and the angle of rotation of the crankshaft 820 is in phase with the angle of rotation of the single balance shaft 830.

The crankshaft 820 has a rotational centerline 821 that is collocated with the X-axis, and includes a crankshaft eccentric mass $m_p$ 822 that has a center of mass that is located at a crankshaft radius $r_{cw}$ 823 distal to the centerline 821. The rotational centerline 821 defines a locus of (0,0) for the analyses described herein.

The single balance shaft 830 has a rotational centerline 831 that is defined by locus $(Y_1, Z_1)$ wherein $Y_1$ 835 is a lateral distance along the Y-axis 815 and $Z_1$ 839 is a vertical distance along the Z-axis 819. The single balance shaft 830 includes a counterweight having eccentric mass $m_{b1}$ that has a center of mass that is located at a single radius $r_{b1}$ 833 distal to the rotational centerline 831 that is defined by locus $(Y_1, Z_1)$. A vector 836 defined by a line segment between the locus $(Y_1, Z_1)$ and the single counterweight 832 having eccentric mass $m_{b1}$ is in phase but rotating in an opposite direction.

The primary vertical force acting upon the engine 810 may be zeroed out by having a counter imbalance force N as follows:

$$N_{cw} = N_1 = F/2 \quad [14]$$

wherein $N_{cw}$ represents the imbalance force of the counterweight 822 acting on the crankshaft 820, $N_1$ represents the imbalance force of the counterweight 832 acting on the single balance shaft 830, and F represents the amplitude of the primary imbalance vertical load F cos θ 829.

Primary balancing of the rotating elements includes determining various forces acting on and through the various rotating elements in context of the overall system. The forces include the primary vertical load F cos θ 829, which is due to the system reciprocating mass assuming the primary lateral load has been zeroed out; an imbalance force $N_{cw}$ 826 acting on the crankshaft 820, a single counter imbalance force $N_1$ in the form of vector 836 acting on the single balance shaft 830, and a moment T 828, which represents a primary rolling moment due to the system reciprocating mass.

The imbalance force $N_{cw}$ 826 acting on the crankshaft 820 may be determined as follows:

$$N_{cw} = m_p * r_p * \omega^2 \qquad [15]$$

wherein $\omega$ represents the rotational speed of the crankshaft 820, $m_p$ represents the eccentric mass of the crankshaft 820, and $r_p$ represents the radial distance 823 to a center of the eccentric mass 822 of the crankshaft 820 relative to its centerline 821.

The single counter imbalance force $N_1$ in the form of vector 836 acting on the single balance shaft 830 may be determined as follows:

$$N_1 = m_{b1} * r_{b1} * \omega^2 \qquad [16]$$

wherein $\omega$ represents the rotational speed of the crankshaft 820, $m_{b1}$ represents the eccentric mass of the single balance shaft counterweight 832, and $r_{b1}$ represents the radial distance 833 to a center of mass of the single balance shaft counterweight 832 relative to its centerline 831.

The moments acting upon the engine 810 may be expressed as follows:

$$\Sigma M_x = 0$$

$$T \cos(\theta+\beta) = N_1 * \cos(\theta) * Y_1 + N_1 * \sin(\theta) * Z_1 \qquad [17]$$

wherein $M_x$ represents the various moments acting on the engine 810, T represents the primary imbalance rolling moment due to the system reciprocating mass, i.e., moment T 828, $\beta$ is the phase difference between T and crank angle, $\theta$. Assuming a small value for $\beta$, EQ. 17 may be reduced to EQ. 18.

$$T \cos \theta = N_1 * \cos \theta * Y_1 + N_1 * \sin \theta * Z_1 \qquad [18]$$

EQ. 19 is used for determining the position of Y1, the horizontal position of the balance shaft, as follows.

$$T = N_1 * Y_1 \qquad [19]$$

And EQ. 20 is used for determining the position of Z1, the vertical position of the balance shaft, as follows.

$$0 = N_1 * Z_1 \qquad [20]$$

Thus, $Z_1$ 839 has a dimension for the single balance shaft 830 that is equal to zero, and $Y_1$ 835 has a dimension for the single balance shaft 830 that may be determined as defined in Eq. 17.

Engine design may include accommodation of the single balance shaft 830, including extending or widening the engine block in the Y1 direction. Such accommodation may be coupled to engine block designs that include extensions for frame mounting or coupling to a transmission. Such accommodation may be coupled to engine block designs that include mounting mechanisms for turbochargers or superchargers.

The piston configuration described herein permits the expander cylinder and associated expander piston to be significantly offset from the crankshaft center line without operating issues associated with piston side loading. This allows the stroke of the expander piston to be selected in relation to the crank throw, but does not limit the stroke to be equivalent to the crank throw. Such configurations allow for more compact design of an embodiment of the single-shaft dual expansion internal combustion engine, including an overall shorter engine length, a shorter engine height, and better engine performance through lower gas transfer losses due to the minimization of the lengths of the intake runners for the expander cylinder. The incorporation of a single balance shaft or two balance shafts provides balancing of first order shaking forces and rolling moments for embodiments of the single-shaft dual expansion internal combustion engine described herein that includes offset pistons and multi-linkage mechanism. Such mechanizations allow balancing of first order shaking forces, and provide multiple options for cancelling the first order rolling moment. Thus, there may be flexibility on engine layout. Such arrangements facilitate piston stroke reduction and deactivation and allows the expander piston to be significantly offset from the centerline of the crankshaft. This facilitates a more compact design of a single-shaft dual expansion internal combustion engine that includes an expander piston and a compound exhaust, in terms of a shorter overall engine length, a shorter transfer port length resulting in lower gas transfer losses, improved design options for cylinder heads, valve and camshafts in a piston compound architecture, and reduced piston side loading resulting in a reduction in friction.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A single-shaft dual expansion internal combustion engine, comprising:
   an engine block, a cylinder head, a crankshaft, and a multi-link connecting rod assembly;
   first and second power cylinders and an expander cylinder being formed in the engine block and enclosed by the cylinder head;
   first and second power pistons being moveable in the first and second power cylinders, respectively, and being connected to respective first and second crankpins of the crankshaft;
   an expander piston being moveable in the expander cylinder and being connected via the multi-link connecting rod assembly to a third crankpin of the crankshaft;
   a first balance shaft arranged in a first longitudinal opening in the engine block;
   a second balance shaft arranged in a second longitudinal opening in the engine block;
   wherein the first balance shaft is disposed on a common lateral side of the engine block as the second balance shaft relative to a vertical axis that passes through a centerline of the crankshaft;
   wherein the first balance shaft is disposed on a common vertical side of the engine block as the second balance shaft relative to a lateral axis that passes through the centerline of the crankshaft;
   the first and second balance shafts having first and second counterweights, respectively, wherein the first and second balance shafts are disposed to generate respective first and second counter imbalance forces; and
   the crankshaft having a third counterweight, the third counterweight including an eccentric mass disposed at a radial distance from a centerline of the crankshaft to generate an imbalance force that compensates for the first and second counter imbalance forces.

2. The engine of claim 1, wherein the first and second balance shafts are arranged to rotate at the same rotational speed as the crankshaft.

3. The engine of claim 2, wherein the first and second balance shafts are arranged to rotate in opposite directions, including the first balance shaft rotating in the same direction as the crankshaft and the second balance shaft rotating in a direction opposite to the rotation of the crankshaft.

4. The engine of claim 1, wherein the third counterweight causing the imbalance in the crankshaft has an eccentric mass that is greater than a magnitude associated with an internally balanced crankshaft.

5. The engine of claim 1, wherein the third counterweight causing the imbalance in the crankshaft has an eccentric mass that is less than a magnitude associated with an internally balanced crankshaft.

6. The engine of claim 1, further comprising a control shaft linked to the multi-link connecting rod assembly and having an axial centerline that is parallel with and rotatably coupled to the crankshaft;

wherein the first and second balance shafts are arranged in the engine block with the first balance shaft collocated with the control shaft.

7. The engine of claim 1, wherein the first and second balance shafts are arranged in the engine block in a splayed configuration.

8. The engine of claim 1, wherein the first and second balance shafts are arranged in the engine block at a common Z-dimension height.

9. The engine of claim 1, wherein a throw of the third crankpin is rotated 180° around a longitudinal axis of the crankshaft from a throw of the first and second crankpins.

10. The engine of claim 1, wherein the multi-link connecting rod assembly includes a rigid main arm extending orthogonally to a lateral axis of the crankshaft and supporting a first pivot pin located on a first end of the main arm, a second pivot pin located on a central portion of the main arm and a third pivot pin located on a second end of the main arm;

the first pivot pin being coupled via a connecting rod to the expander piston; and the second pivot pin being coupled to a crankpin of the crankshaft.

11. The engine of claim 1, wherein an eccentric mass of the crankshaft counterweight and a location of the first balance shaft are selected to minimize rolling torque in the engine.

* * * * *